US010649551B1

(12) United States Patent
Wang et al.

(10) Patent No.: US 10,649,551 B1
(45) Date of Patent: May 12, 2020

(54) PEN MOUSE WITH AN INCLINING COMPENSATION FUNCTION

(71) Applicant: PixArt Imaging Inc., Hsin-Chu (TW)

(72) Inventors: Yen-Chang Wang, Hsin-Chu (TW); Tsung-Fa Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 16/233,114

(22) Filed: Dec. 27, 2018

(51) Int. Cl.
*G06F 3/0354* (2013.01)
*G06F 21/32* (2013.01)
*G06F 3/03* (2006.01)

(52) U.S. Cl.
CPC ........ *G06F 3/03545* (2013.01); *G06F 3/0321* (2013.01); *G06F 21/32* (2013.01)

(58) Field of Classification Search
None
See application file for complete search history.

(56) References Cited

U.S. PATENT DOCUMENTS

| 2002/0148655 | A1* | 10/2002 | Cho | G06F 3/03542 178/18.09 |
| 2013/0106777 | A1* | 5/2013 | Yilmaz | G06F 3/044 345/174 |
| 2015/0070328 | A1* | 3/2015 | Yamaguchi | G06F 3/0321 345/175 |
| 2015/0286293 | A1* | 10/2015 | Gruhlke | G06F 3/03542 345/182 |
| 2017/0102790 | A1* | 4/2017 | Chung | G06F 3/03542 |

* cited by examiner

*Primary Examiner* — Kent W Chang
*Assistant Examiner* — Nathaniel P Brittingham
(74) *Attorney, Agent, or Firm* — Winston Hsu

(57) ABSTRACT

A pen mouse with an inclining compensation function includes an optical sensor, a sensor array, a pen tip and a processor. The optical sensor is adapted to sense a relative movement of an object. The sensor array has a plurality of sensing units. The pen tip is connected to the sensor array and adapted to activate at least one of the plurality of sensing units when being pressed by the object. The processor is electrically connected with the sensor array. The processor is adapted to compute a trace of the pen mouse via analysis of the relative movement and further to compensate the trace via analysis of the activated sensing unit.

10 Claims, 5 Drawing Sheets

PEN MOUSE WITH AN INCLINING COMPENSATION FUNCTION

BACKGROUND OF THE INVENTION

1. Field of the Invention

The present invention relates to a pen mouse, and more particularly, to a pen mouse with an inclining compensation function.

2. Description of the Prior Art

A conventional optical pen mouse utilizes an optical navigation chip disposed on a pen tip to read a moving trace of the pen tip on a reference plane. The moving trace is transmitted to an external electronic device and can be displayed on a screen. The optical navigation chip is disposed inside the pen tip of normal and acceptable look; when the optical pen mouse is handled for writing characters or drawing patterns, the pen tube of the optical pen mouse is tilted relative to the reference plane, and the optical navigation chip is slightly oblique relative to the reference plane because of an inclination angle. As the optical pen mouse is operated to draw a horizontal line on the reference plane, a line displayed on the screen is oblique than the horizontal line.

For solving the above-mentioned mistake, the conventional optical pen mouse disposes the optical navigation chip obliquely inside the pen tip to overcome the mistake of the drawing line being inconsistent with the digital line displayed on the digital image. However, the inclination angle generated by handling the optical pen mouse is varied according to a palm size, a posture habit and a writing environment of the user. Handwriting deviation (such like inconsistency of the drawing line and the digital line displayed on the digital image) cannot be effectively overcome by conventional hardware calibration of disposing the optical navigation chip obliquely inside the pen mouse.

SUMMARY OF THE INVENTION

The present invention provides a pen mouse with an inclining compensation function for solving above drawbacks.

According to the claimed invention, a pen mouse with an inclining compensation function includes an optical sensor, a sensor array, a pen tip and a processor. The optical sensor is adapted to sense a relative movement of an object. The sensor array has a plurality of sensing units. The pen tip is connected to the sensor array and adapted to activate at least one of the plurality of sensing units when being pressed by the object. The processor is electrically connected with the sensor array. The processor is adapted to compute a trace of the pen mouse via analysis of the relative movement and further to compensate the trace via analysis of the activated sensing unit.

According to the claimed invention, the processor analyzes a position change and a quantity change of the activated sensing unit to determine an inclined angle of the pen tip relative to the object. A compensation parameter of the trace is computed in accordance with the inclined angle. The processor compensates the trace when the inclined angle exceeds a threshold.

According to the claimed invention, The processor compares a sensing result of the sensor array with a predefined value for biological identification. The processor analyzes a sensing result of the sensor array to determine pressure variation applied to the pen tip for adjusting a trace width of the pen mouse. The sensor array is a pressure sensor array or a capacitive sensor array.

According to the claimed invention, the pen mouse further includes a memory electrically connected with the processor and adapted to store a sensing result of the sensor array. A quantity change and a position change of the activated sensing unit are stored in the memory, the processor compares the pre-stored quantity change and the pre-stored position change with a current quantity change and a current position change to identify whether a user of the pen mouse is authorized.

The pen mouse of the present invention utilizes the sensor array to sense the pressure variation applied to the pen tip, and the sensing result of the sensor array can be used to calibrate the deviation of the moving trace, to adjust the width of the moving trace, and to verify the user is authorized or not. The sensor array has the plurality of sensing units, so that the sensor array can acquire the inclined angle of the pen mouse relative to the object because some part of the sensing units are pressed by the pen tip, and the position and the quantity of the said part of the sensing units can be used to compute the compensation parameter for calibrating the trace deviation of the pen mouse. Comparing to the prior art, the pen mouse of the present invention can utilize the sensor array to calibrate the trace via simple computation and have an improved operational efficiency and calibration accuracy.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
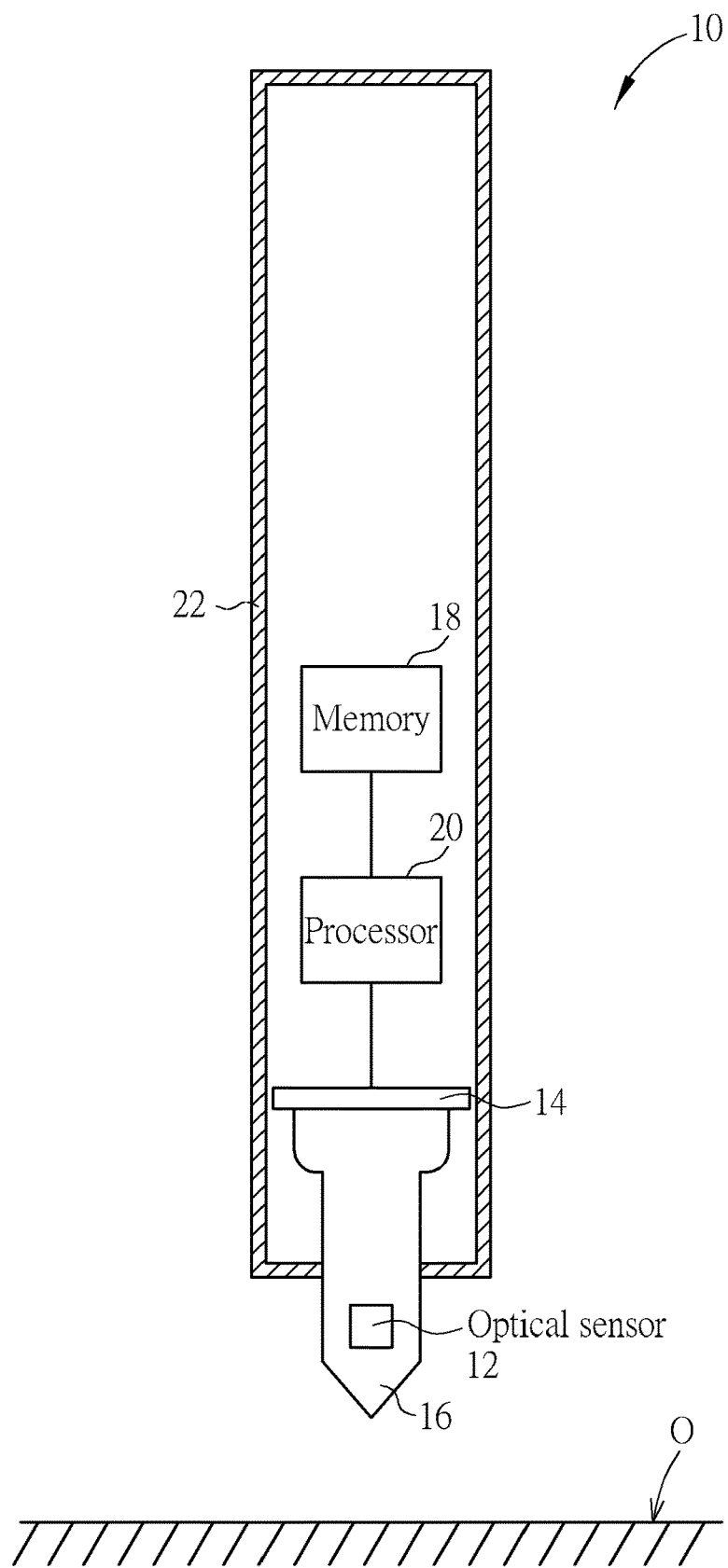
FIG. 1 is a schematic diagram of a pen mouse according to an embodiment of the present invention.
Figure 2:
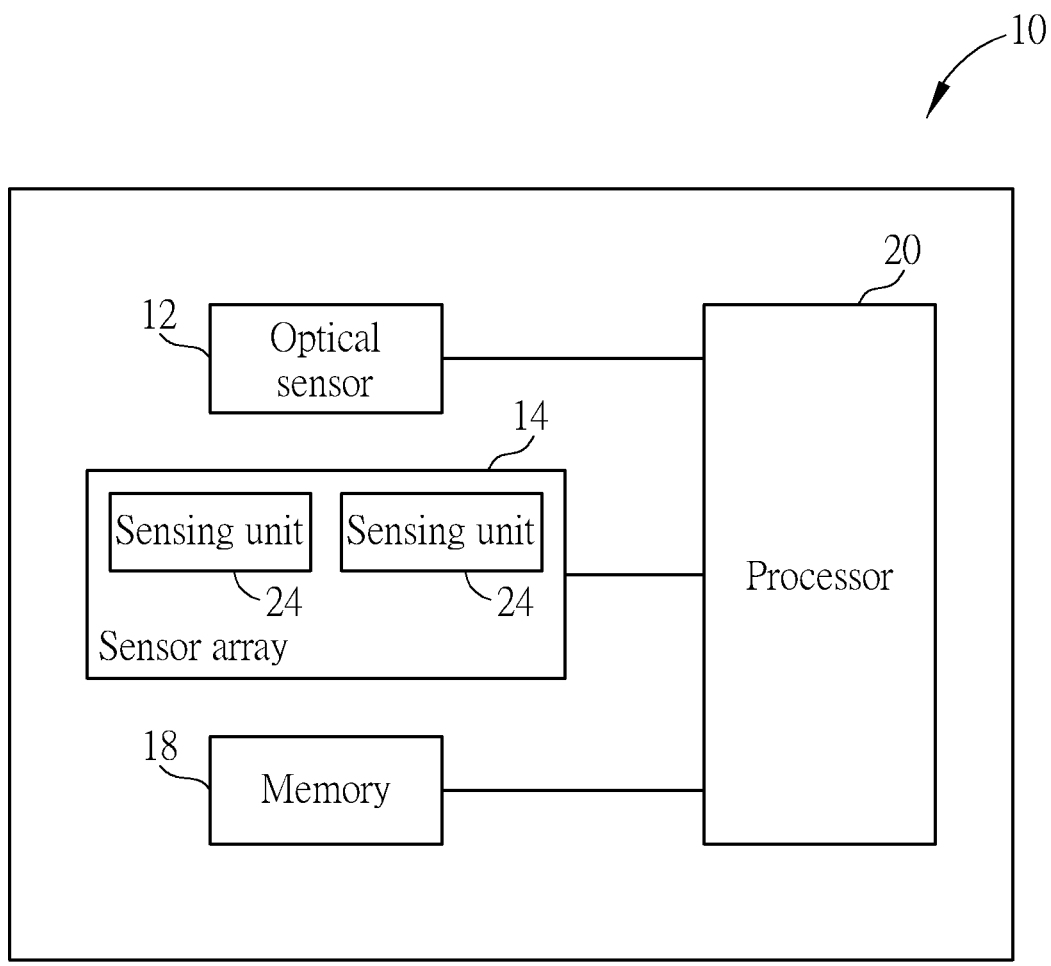
FIG. 2 is a functional block diagram of the pen mouse according to the embodiment of the present invention.

Please refer to FIG. 1 and FIG. 2. FIG. 1 is a schematic diagram of a pen mouse 10 according to an embodiment of the present invention. FIG. 2 is a functional block diagram of the pen mouse 10 according to the embodiment of the present invention. The pen mouse 10 can include an optical sensor 12, a sensor array 14, a pen tip 16, a memory 18 and a processor 20. The processor 20 is electrically connected with the optical sensor 12, the sensor array 14 and the memory 18. The optical sensor 12 can be used to sense a relative movement of an object O when the pen mouse 10 is moved above the object O. The pen tip 16 can be connected to the sensor array 14 and movably disposed inside a housing 22 of the pen mouse 10. The sensor array 14 can have a plurality of sensing units 24 used to sense motion of the pen tip 16. The said motion can be a vertical movement or an inclining movement of the pen tip 16. The memory 18 can be used to store sensing results of the optical sensor 12 and the sensor array 14.

Figure 3:
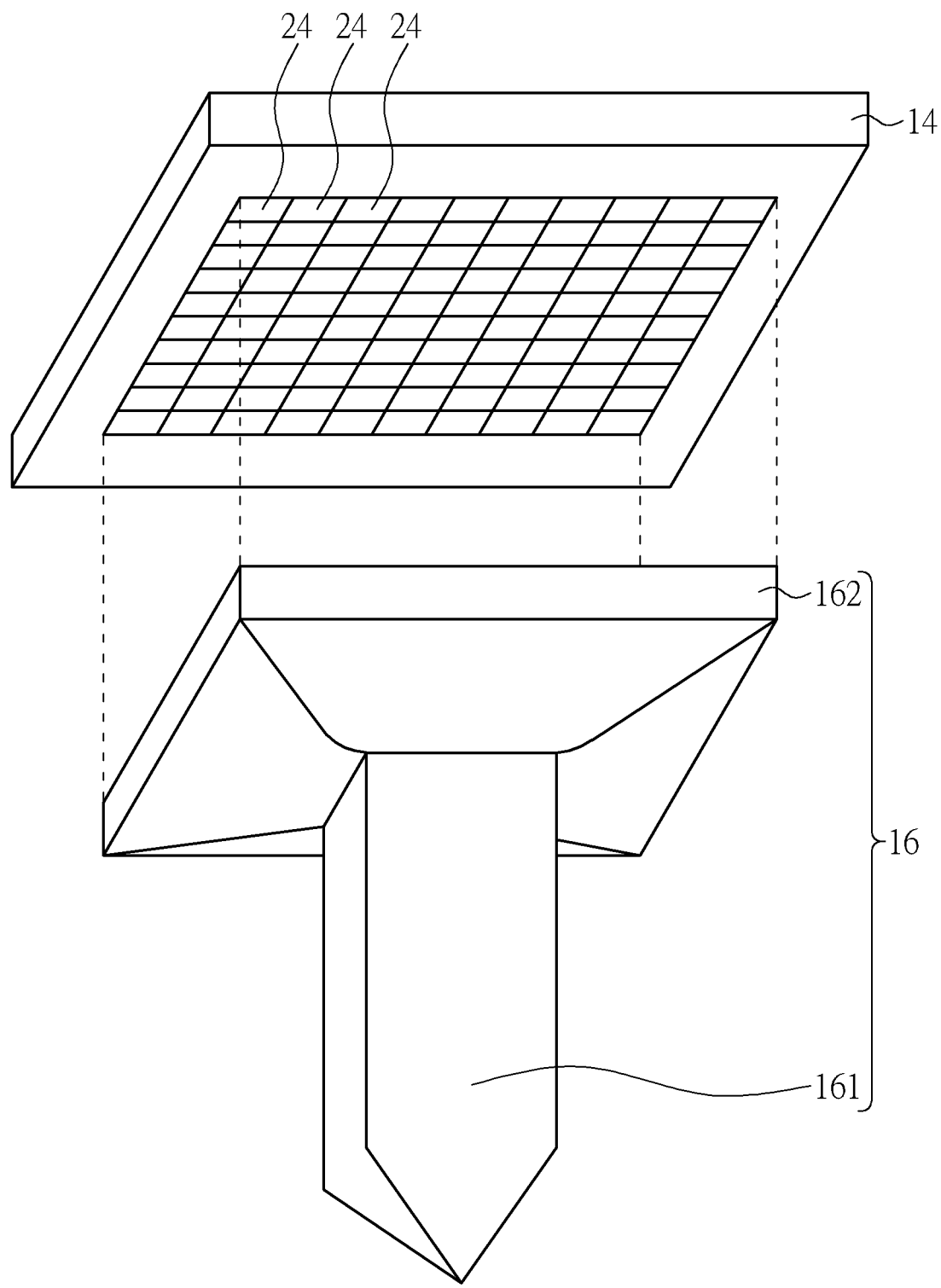
FIG. 3 is a diagram of a sensor array and a pen tip according to the embodiment of the present invention.
Figure 4:
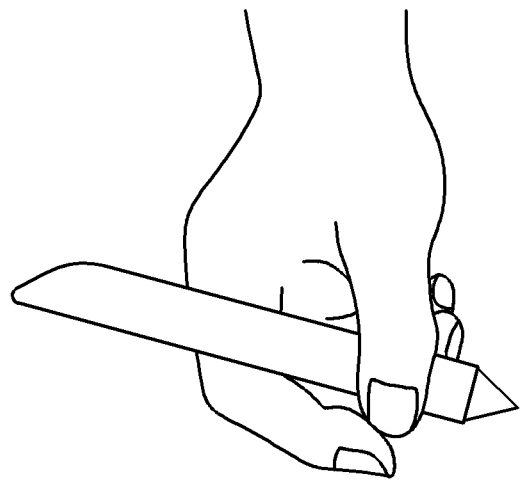
FIG. 4 and FIG. 5 are diagrams of sensing units and the sensor array in different situations according to the embodiment of the present invention.
Figure 4:
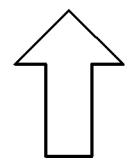
Figure 4:
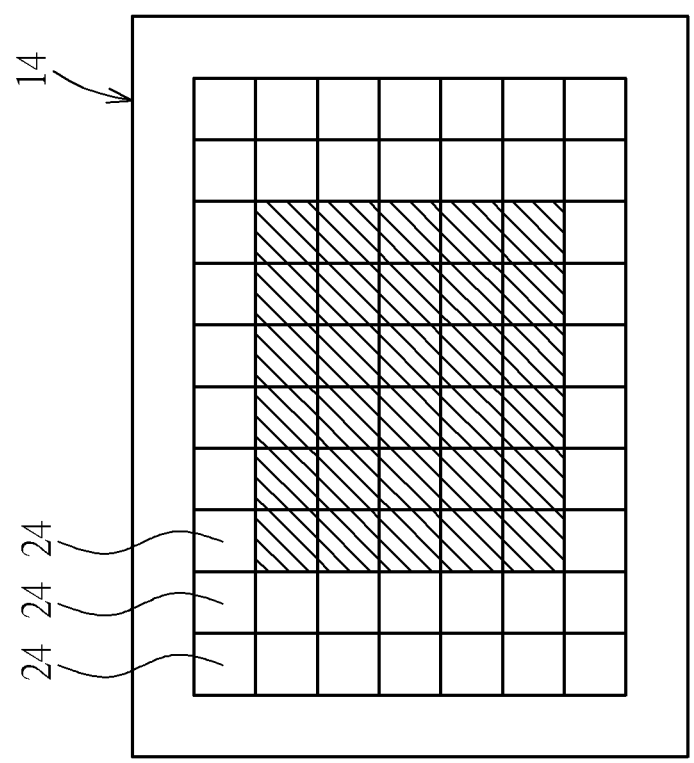
Figure 5:
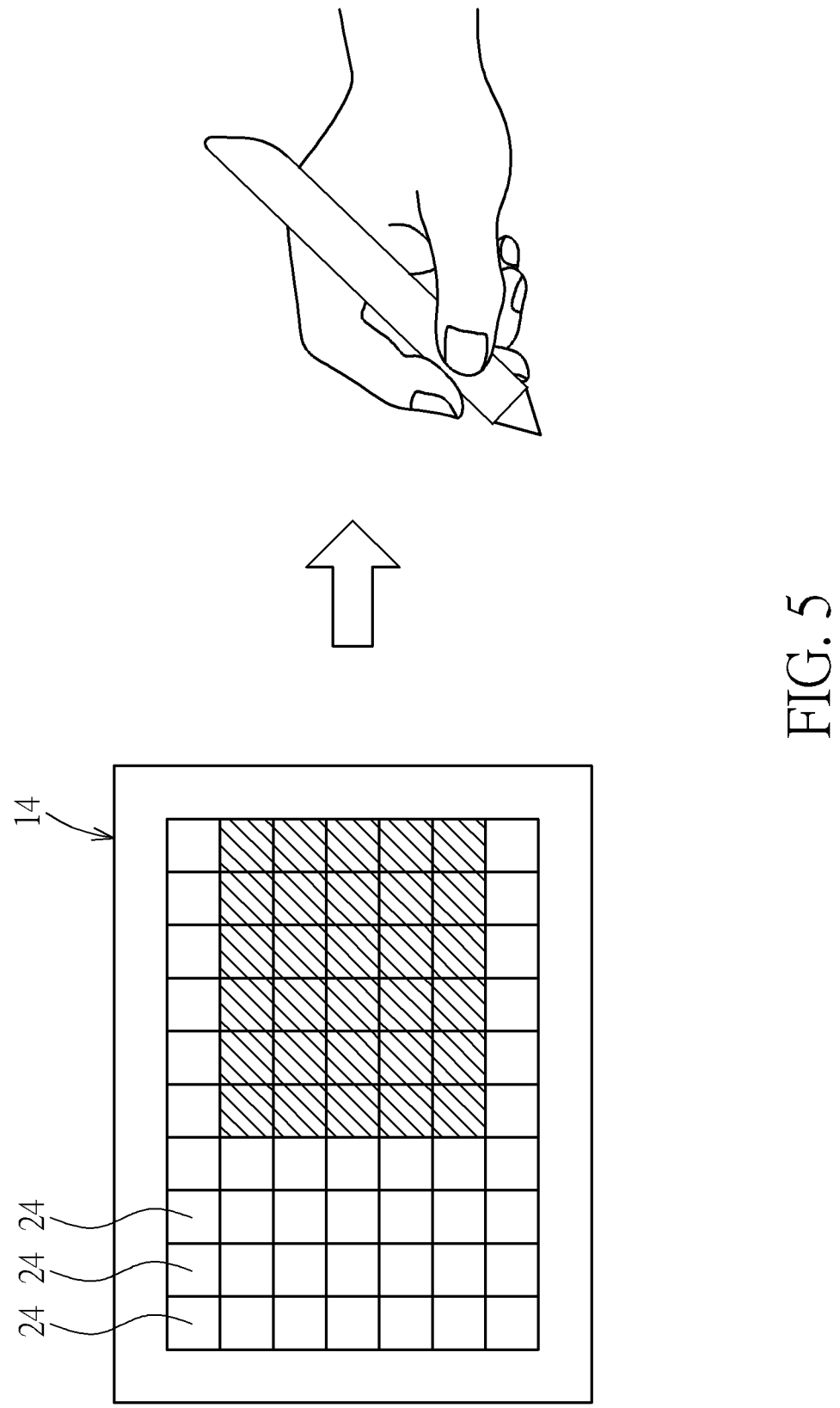

Please refer to FIG. 1 to FIG. 5. FIG. 3 is a diagram of the sensor array 14 and the pen tip 16 according to the embodiment of the present invention. FIG. 4 and FIG. 5 are diagrams of the sensing units 24 and the sensor array 14 in different situations according to the embodiment of the present invention. The optical sensor 12 can be used to sense a feature point or texture of the object O for acquiring the relative movement. The relative movement may have an error in response to the tilted pen mouse 10, therefore the sensor array 14 can be used to calibrate the error and the pen mouse 10 can output a correct trace. The pen tip 16 may have a first end 161 and a second end 162 opposite to each other. The first end 161 of the pen tip 16 can be used to contact the object O for drawing a line, and the second end 162 of the pen tip 16 can be a plate-typed structure abutting against the plurality of sensing units 24 on the sensor array 14. Dimensions of the second end 162 may be preferably equal to dimensions of an assembly of the sensing units 24. Each of the sensing units 24 can be activated by pressure from the pen tip 16.

The plurality of sensing units 24 can be arranged as a matrix or any other forms. All the sensing units 24 may be activated in response to the pen mouse 10 perpendicular to the object O. Some of the sensing units 24 may be activated in response to the pen mouse 10 tilted to the object O. As shown in FIG. 4, the activated sensing unit 24 can be gathered in a central area of the sensor array 14 when the pen mouse 10 is nearly perpendicular to the object O. As shown in FIG. 5, the activated sensing unit 24 can be gathered in a lateral area of the sensor array 14 when the pen mouse 10 is tilted to the object O. The processor 20 can compute an original trace of the pen mouse 10 via analysis of the relative movement, and analyze arrangement of the activated sensing unit 24 to acquire an inclined angle of the pen mouse 10 relative to the object O, therefore the original trace of the pen mouse 10 can be compensated by the acquired inclined angle to calibrate deviation resulted from the tilted pen mouse 10.

In the embodiment, a position of the activated sensing unit 24 can be changed due to variation of the inclined angle. As mentioned above, the activated sensing units 24 are gathered in the central area of the sensor array 14 in response to the pen mouse 10 perpendicular to the object O, and gathered in the right-side lateral area of the sensor array 14 in response to the pen moue 10 tilted to the right, and gathered in the left-side lateral area of the sensor array 14 in response to the pen moue 10 tilted to the left. A quantity of the activated sensing unit 24 can be changed due to variation of the inclined angle. For example, the quantity of the activated sensing units 24 may be decreased when the pen mouse 10 is moved from a vertical condition to a tilted condition, and the said quantity may be increased when the pen mouse 10 is returned from the tilted condition to the vertical condition.

As the pen mouse 10 starts to tilt, the inclined angle is generated and can be sensed by the sensor array 14. The processor can compare the sensed inclined angle with a threshold for determining the related compensation process. If the inclined angle is smaller than the threshold, the pen mouse 10 is tilted but the deviation is under tolerance, so the processor 20 may not adjust the original trace by the inclined angle. If the inclined angle exceeds the threshold, the pen mouse 10 is tilted and over the tolerance, so that the processor 20 can compute a compensation parameter of the trace in accordance with the inclined angle and then use the compensation parameter to compensate the trace. Therefore, any sensor array capable of sensing variation of the pressure angle belongs to a scope of the present invention. For example, the sensor array 12 can be a pressure sensor array or a capacitive sensor array.

The pen mouse 10 of the present invention not only has an inclining compensation function, but also can utilize a pressure sensing function to execute biological identification. For a start, the user can handle the pen mouse 10 to write some words or patterns as password, and the optical sensor 12 and the sensor array 14 can respectively acquire the related sensing results, such as the moving trace of the pen tip 16 and a quantity change and a position change of the activated sensing units 24. The foresaid sensing results can be stored inside the memory 18. Then, if the pen mouse 10 is handled to write any words or any patterns, the processor 20 not only can compare the password moving trace with a current moving trace, but also can compare the pre-stored quantity change and the pre-stored position change with a current quantity change and a current position change. The password trace conforming to the current trace and the pre-stored changes conforming to the current changes can represent that the pen mouse 10 is handled by an authorized user, and functions of the pen mouse 10 can be actuated accordingly.

In addition, the processor 20 can analyze the sensing result of the sensor array 14 to acquire an external force applied to the pen tip 16, and then adjust a trace width of the pen mouse 10 in accordance with pressure variation applied to the pen tip 16. For instance, the trace width can be decreased in response to the slight external force applied to the pen mouse 10, and can be increased in response to the heavy external force applied to the pen mouse 10. The slight external force may be represented by a sensing result of the activated sensing unit 24 or a small amount of the activated sensing unit 24, and the heavy external force may be represented by the sensing result of the activated sensing unit 24 or a large amount of the activated sensing unit 24.

The pen mouse of the present invention utilizes the sensor array to sense the pressure variation applied to the pen tip, and the sensing result of the sensor array can be used to calibrate the deviation of the moving trace, to adjust the width of the moving trace, and to verify the user is authorized or not. The sensor array has the plurality of sensing units, so that the sensor array can acquire the inclined angle of the pen mouse relative to the object because some part of the sensing units are pressed by the pen tip, and the position and the quantity of the said part of the sensing units can be used to compute the compensation parameter for calibrating the trace deviation of the pen mouse. Comparing to the prior art, the pen mouse of the present invention can utilize the sensor array to calibrate the trace via simple computation and have an improved operational efficiency and calibration accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pen mouse with an inclining compensation function, comprising:
   an optical sensor adapted to sense a relative movement of an object;
   a sensor array having a plurality of sensing units;
   a pen tip connected to the sensor array and adapted to activate at least one of the plurality of sensing units when being pressed by the object; and a processor electrically connected with the sensor array, the processor being adapted to compute a trace of the pen mouse via analysis of the relative movement and further to compare a pre-stored quantity change and a pre-stored position change with a current quantity change and a current position change to identify whether a user of the pen mouse is authorized.

2. The pen mouse of claim 1, wherein the processor analyzes a position change and a quantity change of the activated sensing unit to determine an inclined angle of the pen tip relative to the object.

3. The pen mouse of claim 2, wherein a compensation parameter of the trace is computed in accordance with the inclined angle.

4. The pen mouse of claim 2, wherein the processor compensates the trace when the inclined angle exceeds a threshold.

5. The pen mouse of claim 1, wherein the processor compares a sensing result of the sensor array with a pre-defined value for biological identification.

6. The pen mouse of claim 1, further comprising:
a memory electrically connected with the processor and adapted to store a sensing result of the sensor array.

7. The pen mouse of claim 6, wherein the pre-stored quantity change and the pre-stored position change of the activated sensing unit are stored in the memory.

8. The pen mouse of claim 1, wherein the processor analyzes a sensing result of the sensor array to determine pressure variation applied to the pen tip for adjusting a trace width of the pen mouse.

9. The pen mouse of claim 1, wherein the sensor array is a pressure sensor array or a capacitive sensor array.

10. The pen mouse of claim 1, wherein the processor is further adapted to compensate the trace via analysis of the activated sensing unit.

* * * * *